United States Patent Office 3,782,990
Patented Jan. 1, 1974

---

3,782,990
PROCESS FOR GELLING TRIARYL PHOSPHATES AND RESULTANT PRODUCTS
Jacob Rosin, Maplewood, N.J., assignor to Chris-Craft Industries, Inc.
No Drawing. Filed Apr. 7, 1972, Ser. No. 242,207
Int. Cl. C09k 3/22
U.S. Cl. 106—287 S        11 Claims

ABSTRACT OF THE DISCLOSURE

This invention relates to the process of making gelled triaryl phosphate esters which comprises forming an acidic composition comprising a colloidal solution of silica substantially uniformly distributed in a triaryl phosphate ester and transforming the colloidal solution to a gel by neutralizing the acidity, and to certain of the products made by the process.

BACKGROUND OF THE INVENTION

It has long been known to use gelled phosphates, including triaryl phosphates, for coating the strands of air filters in order to make them more effective to entrap dust particles passing therethrough. U.S. Pats. Nos. 3,-161,609, No. 3,297,460, and No. 3,424,601 disclose various gelled compositions for this purpose, none of which, however, are entirely suitable. The deficiencies of the first two noted patents are set forth in column 1 of Pat. No. 3,424,601 which notes the syneresis problems and high material costs involved with the compositions of such patents.

Attempts to overcome these problems of the prior art have included the use of combinations of resins as gelling agents but these are not entirely suitable since they require the user to work with materials of high viscosity. It has long been desired to ship to manufacturers of air filters a triaryl phosphate composition of low viscosity which can be readily gelled whenever desired. Moreover, it has been desired to eliminate the use of the very expensive pyrogenic silica in order to accomplish gelling.

SUMMARY OF THE INVENTION

The present invention enables the preparation of intermediate compositions of triaryl phosphates which can be readily gelled by either the producer or the user and, moreover, which provides for gelled triaryl phosphate compositions which do not require the use of resins and/or expensive pyrogenic silica.

Briefly stated, the present invention comprises the process of making gelled triaryl phosphate esters which preferably comprises dissolving a lower aliphatic silicate in a liquid triaryl phosphate ester, hydrolyzing the silicate with an acidic solution to form a colloidal solution of silica substantially uniformly distributed in the ester, and transforming the solution to a gel by neutralizing the acidity of the composition. In an alternate embodiment a prehydrolyzed alcohol of silica can be uniformly incorporated in the ester. The invention also consists of a composition comprising an acidified liquid triaryl phosphate ester having a colloidal solution of silica substantially uniformly distributed throughout the liquid phosphate as well as a gel obtained from the composition by neutralization.

BASIC PARAMETERS OF THE INVENTION

The triaryl phosphate ester useful in this invention can be any of those commonly used as set forth in U.S. Pats. 3,161,609, 3,207,460, and 3,424,601. It is preferred, however, to use tricresyl phosphate, cresyl diphenyl phosphate or isopropylphenyl diphenyl phosphate. With respect to the silicate used, any of the lower aliphatic, particularly alkyl, silicates can be used but preferably the commercially available and inexpensive silicates such as tetraethyl orthosilicate (28.8% $SiO_2$) or ethyl silicate (40% $SiO_2$) can be used.

The hydrolyzing solution for the silicate is one containing preferably an inorganic mineral acid, a water miscible organic solvent such as an alkanol or acetone, and water. The acid used is preferably hydrochloric acid or sulfuric acid. The alkanol used is most suitably a $C_1$–$C_3$ lower alkanol such as methanol, ethanol, isopropanol or propanol. The amount of acid used in the hydrolyzing solution can vary widely, dependent upon the speed of hydrolysis desired. The amount of water in the hydrolyzing solution depends upon the silicate used and is adjusted so as to achieve complete hydrolysis of the particular silicate used.

If desired, in place of hydrolyzing the silicate after it has been dissolved in the phosphate, it is possible to first form a prehydrolyzed alcosol of silica such as those described in Canadian Pat. 840,394 (corresponding to United States application Ser. No. 462,134, filed June 7, 1965), which is then added to the phosphate.

The neutralizing agents useful in this invention are preferably alkanol amines, such as triethanolamine, although other known neutralizing agents can be used, such as aliphatic amines, ammonia, sodium carbonate, ammonium carbonate and buffering agents such as sodium acetate.

According to the invention, for each 100 parts by weight of the triaryl phosphate, there are used from about 1 to about 8 parts by weight of the silicate and preferably about 3 to 6 parts by weight. The amount of the hydrolyzing solution is not critical, except that, as previously noted, the amount of water in the solution must be sufficient to achieve complete hydrolysis. The neutralizing agent is added in at least about the theoretical amount required to neutralize the acidity of the composition.

Lower aliphatic silicates and triaryl phosphates have been found according to this invention to be miscible in all proportions. Thus, in carrying out the process of this invention, the silicate is first dissolved in the triaryl phosphate to form a uniform solution. The hydrolyzing solution, consisting of water, acid and solvent, is then added under vigorous stirring in order to insure complete hydrolysis of the silicate. After the stirring has been completed, the entire composition is heated, normally up to a temperature of about 150° C., and then vacuum gradually applied, normally until about 30 mm. of mercury is reached, to distill off the solvent and the alcohol formed by hydrolysis. At this point, the resultant product is a triaryl phosphate ester having a uniform colloidal solution of silica substantially uniformly distributed therein. This product is quite stable, has a relatively low viscosity and can be shipped as such to users who wish to gel the composition for coating the strands of air filters. All that is required to gel the composition is to neutralize the acidity by the addition of a neutralizing agent of the type discussed above. If just the theoretical amount of triethanolamine is used and only ambient or room temperature utilized, it may take a period of hours to form a perfectly uniform, soft gel. However, by adding an excess of triethanolamine it is possible to get almost instantaneous gelation at temperatures varying from room temperature to about 50° C. Alternately, the temperature of the composition containing only an equivalent amount of triethanolamine can be raised to about 100 to 115° C. with resultant prompt gelation. Many variations in gelation are, therefore, possible depending upon the desires of the end user. What is more important is that the instant processing provides that silica-sols can be produced in liquid triaryl phosphate esters and transported as such until it is desired to transform them into uniform gels by simply neutralizing.

SPECIFIC EXAMPLES

This invention is further specifically described in connection with the following examples in which parts are by weight unless expressly stated to the contrary.

Example 1

To 100 parts of cresyl diphenyl phosphate were added 5 parts of ethyl silicate (40% $SiO_2$ content) to form a uniform solution. To this solution was added 3.777 parts of a hydrolyzing solution consisting of 19.3% $H_2O$, 1.3% HCl and 79.4% methanol under vigorous stirring for about ½ hour at room temperature. This admixture was then slowly heated up to 150° C. with care being taken in the heating to minimize foaming while distilling off the methanol and ethanol formed by hydrolysis. Once a temperature of 150° C. was reached, vacuum was applied gradually up to about 30 mm. of mercury. The resultant composition weighed about 103 parts and was a uniform colloidal solution of silica in the cresyl diphenyl phosphate. The acidity was titrated to pH 7 and calculated as 0.039% as HCl. The silica-sol and ester composition can either be shipped as such and gelled by the user or gelled promptly. In either event, such gelling is accomplished by neutralizing the acidity; in the instant case such was accomplished by adding triethanolamine in the amount of 0.16% of the weight of the composition. Gelling can be accomplished under varying conditions, such as (a) by simply adding the theoretical amount of triethanolamine noted above which required 48 hours at ambient temperature to form a preferably uniform soft gel, (b) heating the composition to 100-115° C. which resulted in immediate gelation and formation of a very firm gel, (c) heating up to 50° C. and adding about three times the theoretical amount of triethanolamine which results in gelation within a few minutes and (d) addition of even larger amounts of triethanolamine at ambient temperature which also resulted in prompt gelation.

Example 2

The procedure and conditions of Example 1 are followed, except that an equivalent amount of tricresyl phosphate is substituted for the cresyl diphenyl phosphate. Equally excellent gels are formed.

Example 3

The procedure and conditions of Example 2 are followed, except that an equivalent amount of isopropylphenyl diphenyl phosphate is substituted for the cresyl diphenyl phosphate.

Example 4

The procedure and conditions of Example 1 are followed, except that an equivalent amount of tetraethyl orthosilicate (28.8% $SiO_2$) is used in place of the ethyl silicate (40% $SiO_2$). The only other change required by this substitution is the adjustment in weight of $H_2O$ in order to provide the $H_2O$ necessary to achieve complete hydrolysis.

Example 5

The procedure and conditions of Example 1 are followed, except in place of methanol used in the hydrolyzing solution there are used separately and in turn ethanol, isopropanol, propanol and acetone. In each case, substantially equivalent gels are obtained.

Example 6

The procedure and conditions of Example 1 are followed, except in place of the triethanolamine neutralizing agent, the equivalent amounts of ammonia, trimethylamine are used separately and in turn. In each case, substantially equivalent gels are obtained.

Example 7

The procedure and conditions of Example 1 are followed, except that the ethyl silicate is not added nor is there any hydrolyzing step. Rather, a prehydrolyzed alcosol of silica as described in Canadian Pat. 840,394 is added and admixed with the cresyl diphenyl phosphate. Again, stable, uniform gels are obtained.

What is claimed is:

1. A process of making gelled triaryl phosphate ester compositions which comprises substantially uniformly distributing a hydrolyzed silica-sol in a liquid triaryl phosphate ester and transforming the resultant solution to a gel by neutralizing the acidity of the composition.

2. A process of making gelled triaryl phosphate ester compositions which comprises dissolving a lower aliphatic silicate in a liquid triaryl phosphate ester, hydrolyzing the silicate with an acidic hydrolyzing solution to form a colloidal solution of silica substantially uniformly distributed in the ester, distilling off the solvent and alcohol formed by hydrolysis and transforming the solution to a gel by neutralizing the acidity of the composition.

3. The process of claim 2 wherein the triaryl phosphate ester is selected from the group consisting of tricresyl phosphate, cresyl diphenyl phosphate, or isopropylphenyl diphenyl phosphate, the silicate is ethyl silicate, and the neutralizing agent is triethanolamine.

4. The process of claim 3 wherein the ester is cresyl diphenyl phosphate.

5. A process of making gelled triaryl phosphate ester compositions which comprises dissolving a prehydrolyzed alcosol of silica in a liquid triaryl phosphate ester.

6. A silica gel formed by neutralizing a composition comprising a liquid triaryl phosphate ester having an acidic colloidal solution of silica obtained by hydrolysis of a lower aliphatic silicate equally uniformly distributed in the phosphate.

7. The composition of claim 6 wherein the ester is selected from the group consisting of tricresyl phosphate, cresyl diphenyl phosphate and isopropylphenyl diphenyl phosphate.

8. The composition of claim 6 wherein tthe ester is cresyl diphenyl phosphate.

9. A process for making gelled triaryl phosphate ester composition which comprises substantially uniformly distributing a hydrolyzed acidified silica-sol in a liquid triaryl phosphate ester wherein the silica sol is acidified with an inorganic acid and transforming the resultant solution to a gel by neutralizing the acidity of the composition with an amine or ammonium salt.

10. The process of claim 9 wherein the triaryl phosphate ester is selected from the group consisting of tricresyl phosphate, cresyl diphenyl phosphate, or isopropylphenyl diphenyl phosphate, the silicate is ethyl silicate, and the neutralizing agent is triethanolamine.

11. The process of claim 9 wherein the ester is cresyl diphenyl phosphate.

References Cited

UNITED STATES PATENTS 3,133,884   5/1964   Graham ............ 252—88
2,431,873  12/1947   Kennelly .......... 106—287 E THEODORE MORRIS, Primary Examiner U.S. Cl. X.R.

106—177; 252—88